Figure 1:
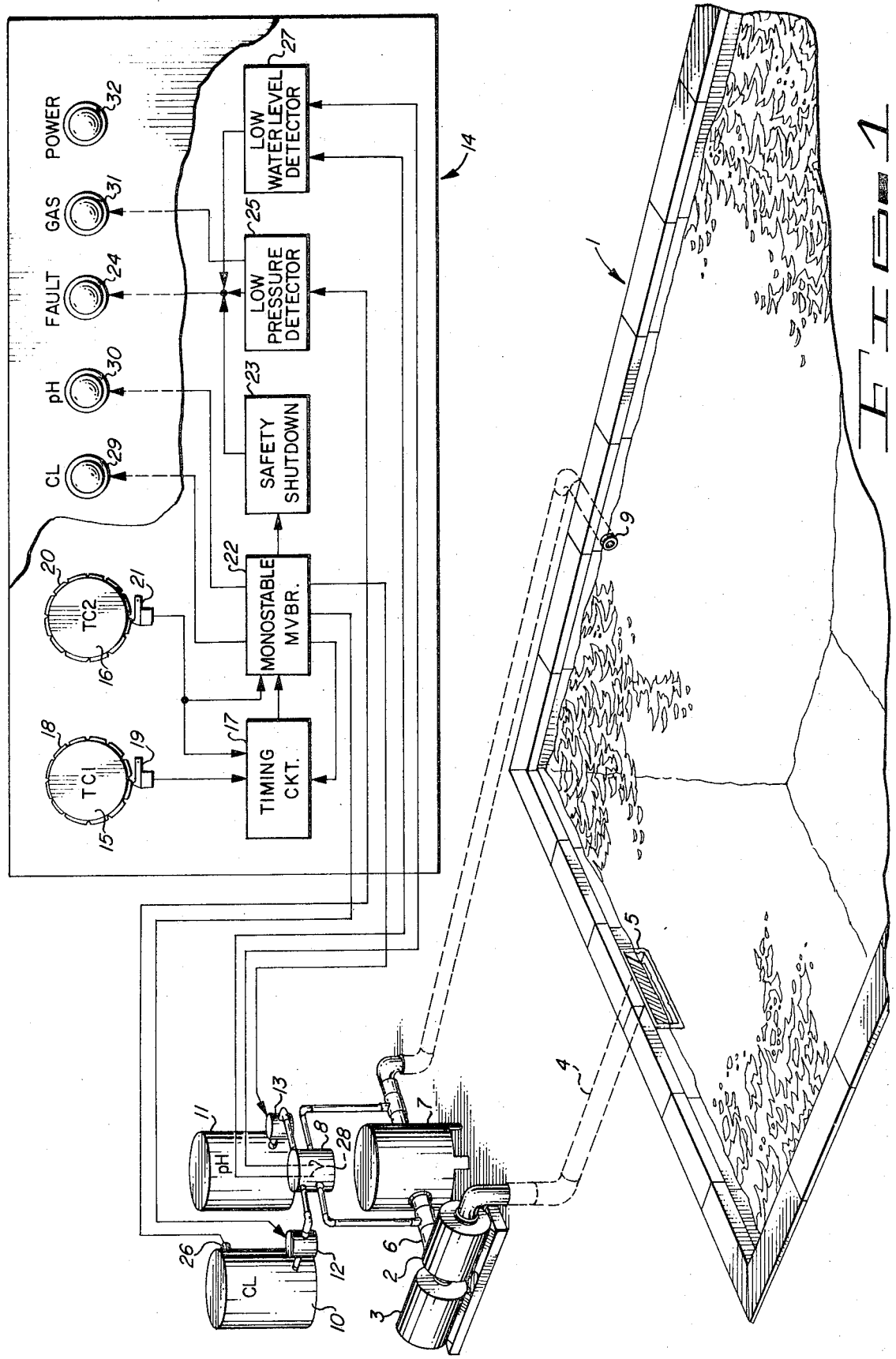

United States Patent [19]
Wellman et al.

[11] 3,804,253
[45] Apr. 16, 1974

[54] SYSTEM FOR AUTOMATICALLY MAINTAINING CHLORINE CONCENTRATION AND PH OF SWIMMING POOL WATER AT PREDETERMINED LEVELS

[75] Inventors: Russell W. Wellman, Colfax, Calif.; Sidney L. Harrell, Scottsdale; Don H. Young, Phoenix, both of Ariz.

[73] Assignee: Waterguard Systems, Inc., Phoenix, Ariz.

[22] Filed: Jan. 29, 1973

[21] Appl. No.: 327,566

[52] U.S. Cl............... 210/85, 210/138, 210/142, 210/143, 210/169
[51] Int. Cl............................................. B01d 35/14
[58] Field of Search ........... 210/85, 138, 139, 142, 210/143, 169, 199

[56] References Cited
UNITED STATES PATENTS

| | | | |
|---|---|---|---|
| 3,351,542 | 11/1967 | Oldershaw et al. | 210/139 X |
| 2,820,701 | 1/1958 | Leslie | 210/169 X |
| 3,528,545 | 9/1970 | Frazel et al. | 210/138 X |

Primary Examiner—Frank A. Spear, Jr.
Assistant Examiner—Robert G. Mukai
Attorney, Agent, or Firm—James H. Phillips

[57] ABSTRACT

First and second time clocks are utilized to set electronic circuitry, respectively, to a scheduled rate of chlorine injection cycles and to alternate selection of chlorine injection or injection of a pH correction material into a mixing chamber disposed in series with swimming pool pumping and filtering apparatus. The electronic circuitry includes an adjustable timer circuit which determines the duration between injection cycles, a monostable multivibrator which determines the duration of the injection phase, and fault detector circuits to indicate such conditions as: insufficient water in the mixing chamber, insufficient chlorine gas pressure, or an injection phase which is too lengthy. Faulty indication is removed upon correction of either of the first two faults, and direct disabling action is taken in case of the latter fault to protect the water system components against corrosion resulting from an unduly high concentration of the additive chemicals.

9 Claims, 2 Drawing Figures

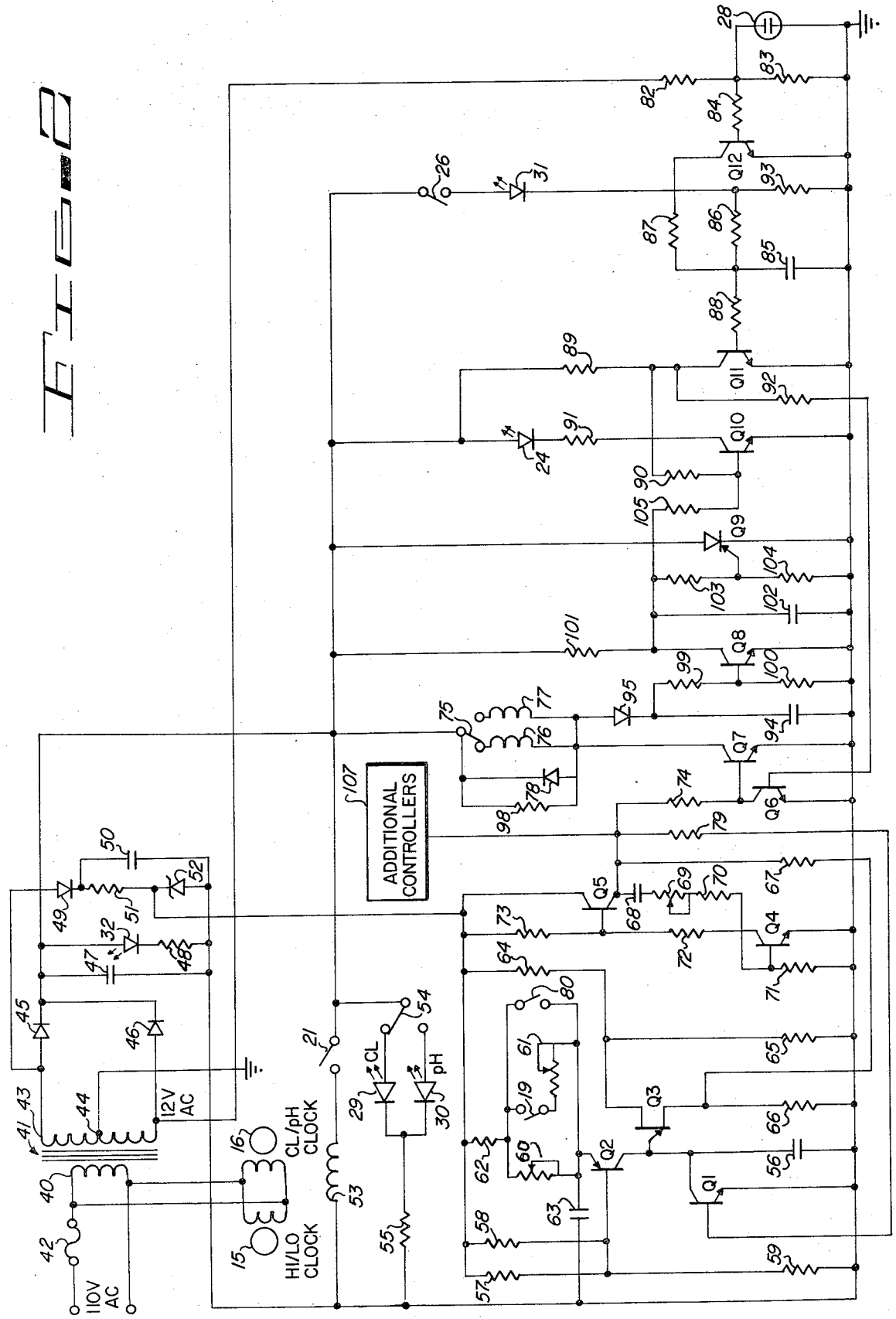

SYSTEM FOR AUTOMATICALLY MAINTAINING CHLORINE CONCENTRATION AND PH OF SWIMMING POOL WATER AT PREDETERMINED LEVELS

This invention relates to the chemical treatment of swimming pools and, more particularly, to apparatus for automatically introducing chlorine and an acidic or base material into the water as necessary in order to maintain a prescribed chlorine concentration and proper acid balance.

In order to prevent the growth of algae and other undesirable organisms, it is conventional practice to introduce chlorine into swimming pool water and to maintain the chlorine at a predetermined concentration between a prescribed minimum and maximum. The chlorine introduced into the water may be in liquid, gas, or granular form. Regardless of the form of the concentrated chlorine, it combines with the water to create a very dilute chlorine, water mixture to inhibit the growth of organisms in accordance with well known principles. However, both use and exposure to the sun greatly accelerate the loss of chlorine which characteristically boils from the water into the atmosphere. Additionally, some chlorine is lost through combination with contaminants. As a result, the chlorine content should be tested rather often and brought up above the minimum level as necessary. In smaller swimming pools, chlorine has usually been introduced into the pool manually while the larger pools may be provided with automatic chlorine metering apparatus although the chlorine content of many larger pools is also maintained manually. The automatic chlorinating devices of the prior art, where fitted, have been both costly and inefficient and, for these reasons, have found little favor in the smaller swimming pools and have not been fully accepted for large pools.

Similarly, in order to maintain the pH level near neutral for the comfort and safety of the swimmers, it has been the custom to make frequent tests of the pH level. An acid or base concentrate is thereafter added to the pool water in accordance with the results of the test. In a given swimming pool, because of the source of its makeup water, the concentrate to be added will ordinarily be either acid or base, acid being more common because most source water is slightly alkaline. The same observations made in conjunction with apparatus for maintaining a proper chlorine level may be made with respect to the known apparatus for maintaining a correct pH level.

Thus, those skilled in the art will understand that it would be highly desirable to provide a relatively simple and efficient adjustable automatic chlorinator and acid or base metering means to maintain the chlorine content and pH level of a given pool within a prescribed range in order to obviate overly frequent testing and manual handling of additive chemicals.

It is therefore a broad object of this invention to provide automatic chemical injection apparatus for swimming pools.

It is another object of this invention to provide automatic metering apparatus for introducing, at a plurality of rates, chlorine into a swimming pool.

It is yet another object of this invention to provide automatic metering apparatus for introducing a pH control material into a swimming pool.

It is a more specific object of my invention to provide such metering apparatus in which the control means are time-shared such that either the chlorine injection phase or the control material injection phase, but not both, will be taking place at a given time.

It is a further object of my invention to provide such control apparatus which gives visual indications of the occurrence of certain faults and takes positive abortive action in the event excessive chemical concentrate is injected at any time.

The subject matter of the invention is particularly pointed out and distinctly claimed in the concluding portion of the specification. The invention, however, both as to organization and method of operation, may best be understood by reference to the following description taken in connection with the accompanying drawing of which:

FIG. 1 is a system block diagram illustrating the interconnection of the electronic and mechanical elements thereof; and FIG. 2 is a detailed schematic of the electrical and electronic system components.

Referring to FIG. 1, a swimming pool 1 is coupled to the usual circulating pump 2, which is driven by a motor 3, by an intake line 4 which withdraws water from a drain 5. In practice, of course, a number of drains may communicate with the suction port of the pump 2. The exhaust line 6 forces circulating water under pressure through a filter 7 and mixing chamber 8 in parallel before the cleaned and conditioned water is discharged at the pool end 9 of exhaust line 6.

A first storage tank 10 contains a source of gaseous chlorine under pressure. A second storage tank 11 contains a liquid acid concentrate to be utilized in maintaining the pH balance of the water within the pool 1. As previously noted, if the characteristic of the makeup water is acidic, the tank 11 would contain a base concentrate; however, the more common occurrence of alkaline water will be considered in the following discussion for purposes of illustration. A first solenoid-operated valve 12 admits, when energized, chlorine into the mixing chamber 8. Similarly, a second solenoid-operated valve 13 admits, when energized, acid concentrate from the storage tank 11 into the mixing chamber 8. Energization of the solenoid-operated valves 12 and 13 is carried out under the supervision of control subsystem 14. The mechanical characteristics of the valves 12 and 13 may be selected to accommodate the particular form of chlorine and pH correcting material utilized in a given installation.

The control subsystem 14 contains a first time clock 15 and a second time clock 16. As will become more fully apparent as the description proceeds, the first time clock 15 provides control signals to a timing circuit 17 which determines the length of time between chlorine injection states according to the time of day or night as reflected in the position of peripheral cam 18 and cam follower switch 19. The peripheral cam 18 rotates once in 24 hours to provide a daily repetitive chlorine injection schedule. Those skilled in the art will appreciate that many time clocks of different configurations are readily available on the market to meet the requirements of the time clocks 15 and 16 and that the on and off schedules may be readily manually adjusted.

The second time clock 16 is utilized to determine whether chlorine or acid will be injected, according to the profile of a peripheral cam 20 acting on a cam follower switch 21. Both the timing circuit 17 and the selection of the solenoid-operated valve 12 or 13 to be energized are affected by the schedule programmed into time clock 16.

A monostable multivibrator 22 is utilized to control the length of time during which the solenoid-operated valves 12 or 13 will be opened during an injection state. Safety shut-down circuit 23 functions to sense a too lengthy injection state which it aborts in order to avoid an accumulation of chemicals in such a concentration as might adversely affect the equipment. Additionally, the circuit 23 causes the visible fault indicator 24 to light.

Low pressure detector circuit 25 responds to a low pressure condition in the chlorine storage tank 10, sensed by pressure switch 26, to turn on the fault indicator 24 and disable injection cycles until the condition is corrected. Similarly, low water level detector 27 monitors, by means of probes 28, the presence or absence of sufficient water in the mixing chamber 8 for safe chemical injection. If insufficient water is present in the mixing chamber 8, the low water level detector circuit 27 causes the fault indicator 24 to light and temporarily disables injection cycles until the condition is corrected.

Indicators 29 and 30 will be lit in the alternative to provide an indication as to whether the apparatus is in the chlorine or acid injection phase under control of time clock 16. Gas indicator 31 remains illuminated unless the low pressure detector 25 detects a low gas condition such that the operator will be alerted to replenish the chlorine supply when the fault indicator comes on and the gas indicator 31 is extinguished. A power-on indicator 32 provides an indication that the control subsystem 14 is energized and operating.

FIG. 2 illustrates, schematically, the details of the control subsystem 14. The primary winding 40 of a transformer 41 is coupled to a conventional line source. A system overload fuse 42 is provided in series with one side of the line to provide protection against catastrophic failure. The secondary winding 43 of the transformer 41 is 24 volts, center-tapped with the center-tap 44 connected to ground potential. Rectifiers 45 and 46 provide full-wave rectification, and filter capacitor 47 smooths the pulsating d-c to achieve approximately 17 volts d-c to be utilized by certain of the controller transistor circuits. Light-emitting diode 32, in series with current limiting resistor 48, provides the power-on indication.

Another rectifier 49, connected to one side of the secondary winding 43, applies pulsating d-c to a filtering and regulating network comprising filter capacitor 50, resistor 51, and zener diode 52. These components are selected to provide a regulated d-c output of 12 volts at the anode electrode of the zener diode 52 for utilization of the timing circuits.

The previously discussed time clocks 15 and 16 are connected in parallel across the primary winding 40 of the transformer 41 such that they are energized by the line and continue to run unless the fuse 42 is blown or energization is otherwise removed from the controller. The switch 21, which, as previously, noted, follows the program entered into the time clock 16, is disposed in series with a relay coil 53. Hence, when the switch 21 closes, the relay coil 53 is placed across the 17 volt bus and ground and is thereby energized. It will be recalled that the time clock 16 determines whether the controller subsystem is in the chlorine injection phase or the acid injection phase. When the switch 21 is open, as illustrated in FIG. 2, contact sets controlled by the relay coil 53 are in a first position. A first contact set 54 places chlorine phase indicator LED 29 in series with current limiting resistor 55 between the 17 volt bus and ground to indicate that the apparatus is in the chlorine injection phase. When the switch 21 closes in response to the program of the time clock 16; energization of the relay coil 53 switches the contacts 54 to their alternative position in which pH indicator LED 30 is energized. Thus, the present phase in which the apparatus is operating is directly indicated.

The pulse rate of the controller subsystem is determined by the circuit of Q3 which is a unijunction transistor. Timing capacitor 56 is connected between the emitter electrode of the unijunction transistor Q3 and ground. The charging rate of the timing capacitor 56 is controlled by a current source comprising PNP transistor Q2. Resistors 57, 58, and 59 determines the base electrode bias of Q2 such that low clock adjustable resistor 60 and high clock adjustable resistor 61 can regulate the time of charge of C3 through an exemplary range from two seconds to three minutes. Resistor 62, disposed in series with adjustable potentiometers 60 and 61, determines the minimum charge time for the capacitor 56. Capacitor 63 is provided to filter noise or electromagnetic interference at the high impedance emitter input to transistor Q2 in order to keep the charging rate of the timing capacitor 56 at the desired value.

Referring briefly again to FIG. 1, it will be noted that the switch 19 affects the timing circuit 17 according to the program of the time clock 15 which is designated the high-low clock. In FIG. 2, the electrical position of the switch 19 is in series with adjustable resistor 61 which is selectively thrown into parallel with the adjustable resistor 60 when the switch 19 is closed. Thus, when switch 19 is closed, the charging current applied by Q2 to the timing capacitor 56 is determined by resistor 62 and the parallel value of the resistors 60 and 61 whereas, when the switch 19 is open, the charging rate is controlled by the value of the resistor 62 and the resistor 60. The choice of high or low pulse repetition rates is determined by pool usage and time. That is, the chlorine must be replenished at a higher rate during daylight hours and when the pool is in use, and the program of the high-low clock may be adjusted accordingly. Further adjustment to a specific pool configuration and usage may be carried out by appropriately setting the resistors 60 and 61.

When the charge on timing capacitor 56 reaches the intrinsic standoff value of the unijunction transistor Q3, the capacitor 56 begins to discharge through the resistor 66 connected between base 1 of the unijunction transistor and ground. The pulse thus developed is coupled through a series circuit consisting of resistor 67, capacitor 68, adjustable resistor 69, and resistor 70 to the base electrode of NPN transistor Q4.

The length of time that the solenoid-operated valves 12 and 13 (FIG. 1) are open is determined by a monostable multivibrator comprising Q4 and PNP transistor Q5. It will be noted that the pulse developed by the discharge of the timing capacitor 56 through the unijunction transistor Q3 is positive such that transistor Q4 is switched into a conducting state as a result of the application of the timing pulse to its base electrode. When Q4 is thus turned on, its collector current flows through resistor 72 and the emitter-base junction of transistor Q5. This pulse turns on Q5 which is normally biased off. The resulting collector current through transistor Q5 further reinforces the base current into Q4 such that Q4 and Q5 rapidly saturate. The collector electrode of Q5 is then substantially at the 12 volt level and the collector of Q4 is at substantially ground potential. The collector voltage at Q5 brings about current flow through resistor 74 and the base-emitter junction of Q7, thereby turning on Q7 and placing a ground potential on its collector electrode. Resistors 71 and 73 in the monostable multivibrator provide d-c stability to Q4 and Q5 at elevated temperatures so that collector-base leakage currents will not turn the transistors on.

The collector circuit of Q7 includes a second set of contacts 75 which are controlled by the energization of the relay coil 53 to throw either the solenoid coil 76 of the solenoid-operated valve 12 or the solenoid coil 77 of the solenoid-operated valve 13 in circuit between the 17 volt bus and the collector of transistor Q7. With the relay coil 53 de-energized as illustrated in FIG. 2, the solenoid coil 76 will be energized when transistor Q7 is switched on, such that chlorine from the storage tank 10 (FIG. 1) will be admitted into the mixing chamber 8 through the solenoid-operated valve 12. The injection process continues until transistor Q7 is turned off, which duration is controlled by the values of the components in the monostable vibrator circuit.

Thus, when the capacitor 68 has charged such that the base current to transistor Q4 becomes insufficient to keep Q4 saturated, the collector current of Q4 and the base drive to transistor Q5 will begin to decrease. When the transistor Q5 drops out of saturation, its collector current decreases to thereby decrease the drive to the base electrode of Q4 further. This regenerative action results in Q4 and Q5 quickly turning off which removes the base drive from Q7. Q7 is therefore turned off to de-energize the solenoid winding 76 which terminates the injection cycle. A suppressor diode 78 is disposed in parallel with the solenoid coil 76 or 77 to suppress transients generated upon the collapse of the field about the energized coil.

When the collector voltage of Q5 increases toward 12 volts, upon institution of an injection cycle, a portion of the Q5 collector current is coupled, through resistor 79, to the base electrode of transistor Q1 which has its emitter electrode connected to ground and its collector electrode connected to the positive plate of the timing capacitor 56. When the NPN transistor Q1 is turned on by the signal from Q5, timing capacitor 56 is completely discharged to ground potential, thereby affording a reference from which recharge may be commenced as soon as transistor Q1 is turned off in response to the shut-off of transistor Q5. By returning the timing capacitor to a completely discharged condition each time the control subsystem issues an injection pulse, longer and more accurate durations may be achieved between injection pulses.

Consider briefly the result of energizing relay coil 53 responsive to the closure of switch 21. As previously noted, contact set 54 changes position to illuminate the LED 30 rather than the LED 29 to provide a visual indication that the pH mode has been entered. Additionally, contact set 75 changes position to place solenoid coil 77 of solenoid-operated valve 13 into the collector circuit of Q7 such that it will be energized when Q7 is turned on in the manner previously described. Additionally, contact set 80 in the emitter circuit of Q2 shunts both adjustable resistors 60 and 61 such that the charge rate of timing capacitor 56 is maximum, limited only by resistor 62. Thus, the repetition rate is much higher in the pH mode to inject a greater volume of acid than a volume of chlorine which would be injected during the same time duration, even under high clock operation. This is a desirable feature because more pH control material may be added when the pool is not in use to provide ample mixing time. Peripherally, the time clock 16 will ordinarily be in the pH control phase at times when the pool is not in use such as during the early morning hours. It is more important to keep injecting chlorine during daylight hours and during actual usage because chlorine is consumed more quickly than the pH balance is upset during such periods.

Three separate conditions are monitored by the controller subsystem for equipment and personnel safety; viz: energization of either solenoid-operated valve 12 or 13 for a period unusually greater than that dictated by the time constant of the monostable multivibrator, low pressure in the chlorine tank 10, and low water level in the mixing chamber 8. Each of these conditions turns on the fault indicator LED 24. The first condition also deliberately blows fuse 81 to prevent energization of either the solenoid coil 76 or 77 until the condition that brought about the failure has been detected, repaired, and the fuse replaced. Each of the other two faults, which can occur during normal operation and be corrected by routine procedures, temporarily disables energization of either of the solenoid coils 76 or 77.

Consider first the probes 28 in the mixing chamber 8. One probe is connected to ground and the other to the junction between resistors 82, 83, and 84. Resistors 82 and 83 are connected in series between a source of 12 volts a-c (such as one side of the secondary winding 43 of the transformer 41), and the other end of the resistor 84 is connected to the base electrode of NPN transistor Q12. During normal operation, when the mixing chamber 8 is full of water, the probes 28 are shorted to shunt the resistor 83, thereby placing a near ground potential on the base electrode of the transistor Q12. Thus, transistor Q12 is normally cut off. However, when the water level in the mixing chamber drops sufficiently, the probes 28 no longer shunt the resistor 83 such that transistor Q12 is turned on each positive half cycle by current flow through resistor network 82, 83, 84. (Resistor 84 simply prevents transients from the probes from destroying the emitter-base junction of Q12 during handling as during initial installation). A capacitor 85 is normally fully charged through a circuit including the pressure switch 26, the gas indicator LED 31, and resistor 86. However, when Q12 conducts, capacitor 85 is discharged through resistor 87, which is included in the collector circuit of Q12 to limit peak collector current, and Q12. When capacitor 85 is discharging toward substantially ground potential, normally conducting NPN transistor Q11 is shut off by the negative-going pulse coupled through resistor 88. Collector current through resistor 89 in the collector circuit of Q11 will terminate, raising the potential on the base electrode of normally-off NPN transistor Q10 with a current pulse through resistor 90. When Q10 is thus turned on, a current path is established through fault indicator LED 24 and current limiting resistor 91 in the collector circuit, the collector of Q10 being effectively clamped to ground.

Additionally, current flows through resistor 92 to the base electrode of normally-off NPN transistor Q6. As a result, the collector electrode of Q6 is clamped to ground potential, and the base electrode of Q7, which is connected to the collector electrode of Q6, is therefore grounded to prevent transistor Q7 from being turned on by the operation of the monostable multivibrator. Thus, energization of the solenoid coil 76 or 77 is inhibited until the mixing chamber 8 becomes sufficiently filled to short the probes 28. When that condition is reached, Q12 no longer conducts every half cycle such that the capacitor 85 may charge through the resistor 86 until the signal reflected to the base electrode of Q11 is sufficient to turn Q11 back on. The collector electrode of Q11 then reassumes substantially ground potential to turn off transistor Q10 and hence the fault indicator 24. In addition, Q6 is also turned off to again enable Q7 such that normal operation is automatically permitted.

In the event that the pressure in the chlorine storage tank 10 drops sufficiently that the pressure switch 26 opens, current flow through the gas indicator LED 31 is interrupted and the LED is extinguished. Capacitor 85 then commences to discharge through resistor 86 and current limiting resistor 93. When the base current at Q11 becomes insufficient to maintain Q11 in the conductive state, it is cut off to turn on Q10 and Q6 as previously described to illuminate the fault indicator LED 24 and inhibit Q7 to prevent energization of the solenoid coil 76 or 77 until the condition is corrected. When the supply of chlorine has been replenished and the pressure switch 26 closes, the current path through the gas LED 31 and the current limiting resistor 93 is re-established such that the gas indicator 31 again becomes lit to indicate normal operation. Simultaneously, the capacitor 85 is recharged through the resistor 86 and current is applied to the base electrode of Q11 to switch Q11 back on thereby restoring normal operation as previously discussed.

Any condition in the timer, multivibrator, or solenoid coil drive portions of the circuit which result in extended energization of either of the solenoid coils 76 or 77 must be deemed a serious failure inasmuch as high concentrations of chlorine or pH control material could result in destructive corrosion of equipment and possible dangerous chemical conditions in the swimming pool. Therefore, means are provided to deliberately blow the fuse 81 to disconnect the solenoid coil 76 and 77 and certain of the other circuitry from the 17 volt d-c power supply until the condition is corrected and the fuse replaced.

When power is first applied, capacitor 94 is charged through a diode 95 and one or the other of the solenoid coils 76 or 77. A resistor 98 shunting the coils may be provided to make absolutely sure capacitor 94 commences to charge as soon as power is applied even if a fault exists which prevents charging through the coils. NPN transistor Q8 is also turned on by current flowing through the diode 95 and resistor 99 and 100. Thus, the collector electrode of transistor Q8 is normally maintained at ground potential such that a full 17 volts is dropped across resistor 101 and capacitor 102 is normally discharged. Capacitor 102 insures against any positive voltage build-up at the collector of transistor Q8 during initialization as power is applied. This is necessary to prevent inadvertently blowing fuse 81 during such intialization.

The anode of the SCR Q9 is connected to ground, and its cathode is connected to the protected terminal of fuse 81. Its gate electrode is connected to the junction of resistors 103 and 104, resistor 104 having its other end connected to ground to provide a current path for any leakage current from the gate electrode of SCR Q9 so that it will not inadvertently turn itself on at high temperatures. The other end of resistor 103 is connected to the collector electrode of Q8 and also, through resistor 105, to the gate electrode of Q10.

During normal operation, Q7 is turned on intermittently to apply a ground potential to the cathode of diode 95. As a result, capacitor 94 commences to discharge through resistors 99 and 100. However, as soon as Q7 is turned off at the end of a period determined by the time constant of the monostable multivibrator, the charge on capacitor 94 is replenished. In the event some fault causes the ground potential to remain at the collector electrode of Q7 (and therefore holds the solenoid coil in the circuit energized) the capacitor 94 will continue to discharge until current applied to the base electrode of transistor Q8 is no longer adequate to maintain transistor Q8 on. When transistor Q8 is shut off, capacitor 102 rapidly charges to permit current flow through resistor 101 and 103 to the gate electrode of SCR Q9 which therefore fires to place a ground potential on the protected side of the fuse which therefore blows. Simultaneously, the current flow through R101 and resistor 105 turns on transistor Q10 to actuate the fault indicator LED 24. Any attempt at simply replacing fuse 81 will quickly result in a repetition of the above sequence until the component or situation causing the fault is located and corrected.

Referring again to the monostable multivibrator circuit, it will be observed that resistor 106 couples the collector of Q5 to optional additional controllers 107 whereby a plurality of controllers may share the same timer circuit.

In order to fully teach the invention to those skilled in the art, the following exemplary component values are given from actual apparatus prepared in accordance with the present invention:

| | |
|---|---|
| C47 | 1000 nfd |
| C50 | 100 nfd |
| C56 | 100 nfd |
| C63 | 4.7 nfd |
| C68 | 4.7 nfd |
| C85 | 100 nfd |
| C94 | 100 nfd |
| C102 | 100 nfd |
| D24 | LED 60 |
| D29 | LED 60 |
| D30 | LED 60 |
| D31 | LED 60 |
| D32 | LED 60 |
| D45 | HEP 170 |
| D46 | HEP 170 |
| D52 | 12V, 1W |
| D78 | HEP 170 |
| D95 | HEP 170 |
| Q1 | MPS 3394 |
| Q2 | MPS 3702 |
| Q3 | HEP 310 |
| Q4 | MPS 3394 |
| Q5 | MPS 3702 |
| Q6 | MPS 3394 |
| Q7 | MJE 1100 |
| Q8 | MPS 3394 |
| Q9 | MCR 407-1 |
| Q10 | MPS 3394 |

-Continued

| | |
|---|---|
| Q11 | MPS 3394 |
| Q12 | MPS 3394 |
| R48 | 680 |
| R51 | 220 |
| R55 | 680 |
| R57 | 68K |
| R58 | 10K |
| R59 | 56K |
| R60 | 220K adj |
| R61 | 220K adj |
| R62 | 2.2K |
| R64 | 220 |
| R65 | 820 |
| R66 | 56 |
| R67 | 5.6K |
| R69 | 50K adj |
| R70 | 100 |
| R71 | 22K |
| R72 | 10K |
| R73 | 10K |
| R74 | 5.6K |
| R79 | 10K |
| R82 | 33K |
| R83 | 22K |
| R84 | 1K |
| R86 | 10K |
| R87 | 56 |
| R88 | 10K |
| R89 | 1K |
| R90 | 10K |
| R91 | 680 |
| R92 | 10K |
| R93 | 680 |
| R98 | 1K |
| R99 | 10K |
| R100 | 10K |
| R101 | 2.2K |
| R103 | 5.6K |
| R104 | 2.2K |
| R105 | 10K |
| R106 | 22K |
| TC15 ) <br> ) <br> TC16 ) | Intermatic 1200 series |

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

We claim:

1. A system for maintaining the chlorine concentration and pH balance of a swimming pool including a recirculating pump and filter, said system comprising:
   A. a first time clock, said first time clock including first periodically actuated switch means;
   B. a second time clock, said second time clock including second periodically actuated switch means;
   C. a source of chlorine;
   D. a source of pH control material;
   E. a mixing chamber in circuit with said recirculating pump;
   F. first conduit means coupling said source of chlorine to said mixing chamber;
   G. a first solenoid-operated valve in said first conduit means for permitting transfer of chlorine from said source of chlorine to said mixing chamber when said first solenoid is energized;
   H. second conduit means coupling said source of pH control material to said mixing chamber;
   I. a second solenoid operated valve in said second conduit means for permitting transfer of pH control material from said source of pH control material to said mixing chamber when said second solenoid is energized;
   J. a timing circuit for periodically issuing injection pulses at predetermined intervals;
   K. rate means included in said timing circuit for varying the predetermined intervals at which predetermined pulses are issued in response to the state of said first periodically actuated switch means;
   L. solenoid driving means coupled to said timing circuit and responsive to the issuance of an injection pulse thereby to issue an energizing pulse of predetermined duration to one of said solenoid-operated valves from an energy source; and
   M. selection means selectively coupling said solenoid driving means to said first solenoid-operated valve and to said second solenoid-operated valve in response to the state of said second periodically actuated switch means;
   whereby either chlorine or pH control material is injected into said mixing chamber at intervals for mixing with the swimming pool water according to the actuation of said first and second switch means under control, respectively, of said first and second time clocks.

2. The system of claim 1 in which said solenoid driving means include a monostable multivibrator having a predetermined time constant corresponding to the duration of said energizing pulse.

3. The system of claim 2 which further includes safety shutdown means responsive to the issuance of an energizing pulse by said solenoid driving means which exceeds, by a predetermined amount, the predetermined duration of said energizing pulse by decoupling said energy source from said solenoid-operated valves.

4. The system of claim 3 which further includes means responsive to the activation of said safety shutdown means for energizing a visual fault indicator.

5. The system of claim 4 which further includes:
   A. pressure switch means coupled to said source of chlorine and adapted to change state when the pressure in said source of chlorine drops below a predetermined minimum;
   B. temporary disabling means included in said solenoid driving means for selectively inhibiting application of said energizing pulses to said solenoid-operated valves; and
   C. means coupling said pressure switch means to said temporary disabling means whereby said temporary disabling means is activated when the pressure in said source of chlorine drops below said predetermined minimum.

6. The system of claim 5 which further includes means responsive to activation of said temporary disabling means for energizing said visual fault indicator.

7. The system of claim 4 which further includes:
   A. a pair of spaced apart conductive probe means extending into said mixing chamber;
   B. temporary disabling means included in said solenoid driving means for selectively inhibiting application of said energizing pulses to said solenoid-operated valve; and
   C. means coupling said probe means to said temporary disabling means is activated when no liquid conducting path is present between said probes.

8. The system of claim 7 which further includes means responsive to the activation of said temporary disabling means for energizing said fault indicator.

9. The system of claim 8 which further includes:
A. pressure switch means coupled to said source of chlorine and adapted to change state when the pressure in said source of chlorine drops below a predetermined minimum; and
B. means coupling said pressure switch to said temporary disabling means whereby said temporary disabling means is activated when the pressure in said source of chlorine drops below said predetermined minimum.

* * * * *